United States Patent [19]

Barbat et al.

[11] Patent Number: 5,195,391
[45] Date of Patent: Mar. 23, 1993

[54] LINEAR GUIDING AND DRIVING UNIT

[75] Inventors: Serge Barbat, Meaux Cedec, France; Roland Greubel, Ramsthal; Bernhard Keller, Kaisten, both of Fed. Rep. of Germany

[73] Assignee: Deutsche Star GmbH, Schweinfurt, Fed. Rep. of Germany

[21] Appl. No.: 801,258

[22] Filed: Dec. 3, 1991

Related U.S. Application Data

[62] Division of Ser. No. 428,638, Oct. 30, 1989, Pat. No. 5,097,716.

[30] Foreign Application Priority Data

Oct. 31, 1988 [DE] Fed. Rep. of Germany ... 8813656[U]
Sep. 4, 1989 [DE] Fed. Rep. of Germany ... 8910548[U]

[51] Int. Cl.$^5$ .................. F16C 29/06; F16H 21/04; F16H 19/06
[52] U.S. Cl. .................. 74/89.22; 74/89.15; 74/110; 92/88; 248/657; 384/45
[58] Field of Search .............. 384/45; 74/89.2, 89.21, 74/89.22, 110; 92/88; 248/657

[56] References Cited

U.S. PATENT DOCUMENTS

| | | | |
|---|---|---|---|
| 3,670,583 | 6/1972 | Leming | 74/89.15 |
| 3,889,544 | 6/1975 | Suss | 74/89.15 |
| 4,348,064 | 9/1982 | Teramachi | 384/45 |
| 4,478,462 | 10/1984 | Teramachi | 384/45 |
| 4,573,747 | 3/1986 | Frazee | 308/3 A |
| 4,582,369 | 4/1986 | Itoh | 384/45 X |
| 4,649,016 | 3/1987 | Hardin, Jr. | 74/89.15 X |
| 4,828,402 | 5/1989 | Osawa | 384/45 X |
| 4,832,508 | 5/1989 | Teramachi | 384/45 |
| 4,934,202 | 6/1990 | Hikita et al. | 74/89.15 |
| 4,953,418 | 9/1990 | Hirose | 74/89.15 X |
| 5,097,716 | 3/1992 | Barbat et al. | 384/45 |

FOREIGN PATENT DOCUMENTS

| | | |
|---|---|---|
| 0106826 | 4/1984 | European Pat. Off. |
| 431040 | 6/1926 | Fed. Rep. of Germany . |
| 2805141 | 8/1979 | Fed. Rep. of Germany . |
| 2834299 | 2/1980 | Fed. Rep. of Germany . |
| 2914756 | 10/1980 | Fed. Rep. of Germany . |
| 8525063 | 11/1985 | Fed. Rep. of Germany . |
| 3428680 | 2/1986 | Fed. Rep. of Germany . |
| 3527886 | 4/1987 | Fed. Rep. of Germany . |
| 8715922 | 3/1988 | Fed. Rep. of Germany . |
| 2304439 | 10/1976 | France . |
| 56-46154 | 4/1981 | Japan ................. 74/89.22 |
| 58-152928 | 9/1983 | Japan ................. 384/45 |
| 61-61362 | 4/1986 | Japan . |
| 62-17424 | 1/1987 | Japan . |
| 62-200016 | 9/1987 | Japan . |

OTHER PUBLICATIONS

Brochure, Star Schienenfuhrungstische ("Star Rail Guide Tables") (Prior Oct. 30, 1989).
Brochure, Star Linear Schlitten, p. 51 (Prior Oct. 30, 1989).
Brochure, "Festo Pneumatic I" (Prior Oct. 30, 1989).
Brochure, "Ina-Langsfuhrung" (Prior Oct. 30, 1989).
Brochure, "Soga Schlitteneinheit" (Prior Oct. 30, 1989).
Brochure, Hans Worm KG (Prior Oct. 30, 1989).
Publication, Maschinenmarkt, Wurzburg 93 (1987), Hannover-Messe Industrie, p.79.

Primary Examiner—Allan D. Herrmann
Attorney, Agent, or Firm—Brumbaugh, Graves, Donohue & Raymond

[57] ABSTRACT

A generally U-shaped guide carriage is linearly guided on a longitudinally-extending rail track by at least one circuit of roller balls carried by each of the depending flanges of the U-shaped guide carriage. Each ball circuit includes a linear load-bearing row and a linear return row of roller balls. The load-bearing balls bear against facing ball rolling tracks carried by the opposite sides of the rail track. A cross member is connected adjacent one end of the rail track and carries rolling track engagement faces for engaging the ball rolling tracks on the rail track. An entraining unit is connected to the guide carriage, and a linear drive is coupled between the cross member and entraining unit for driving the guide carriage along the rail track. In another embodiment, a common steel insert is carried by each depending flange of the U-shaped guide carriage and supports the load-bearing row or rows of the associated ball circuits.

36 Claims, 15 Drawing Sheets

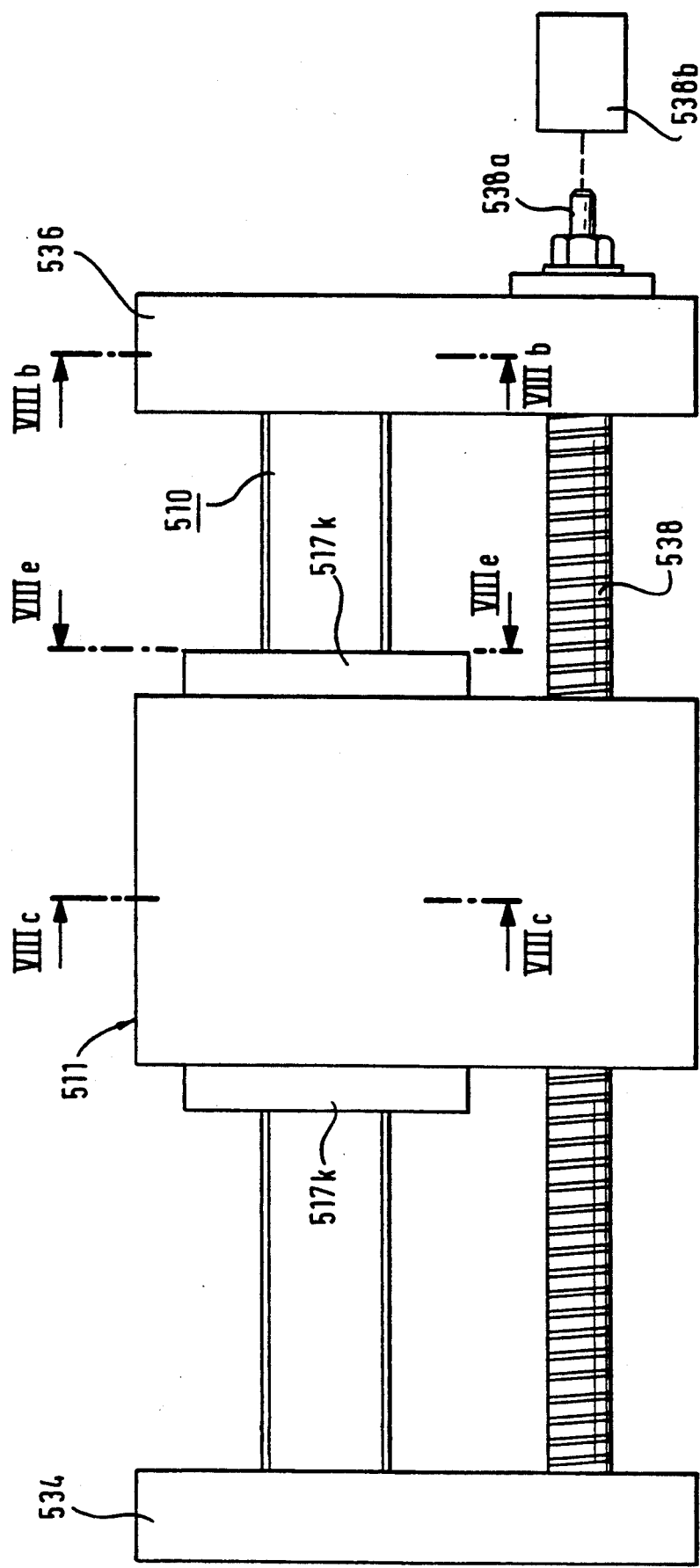

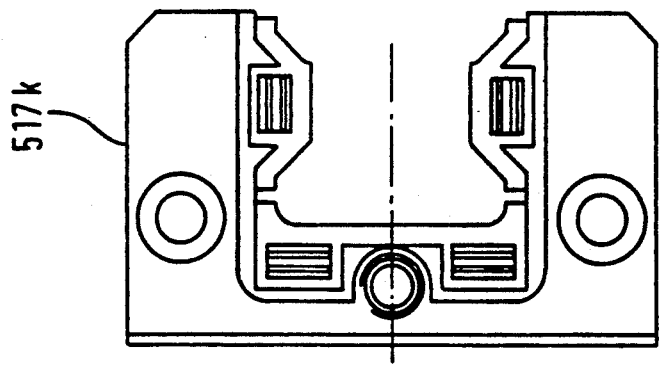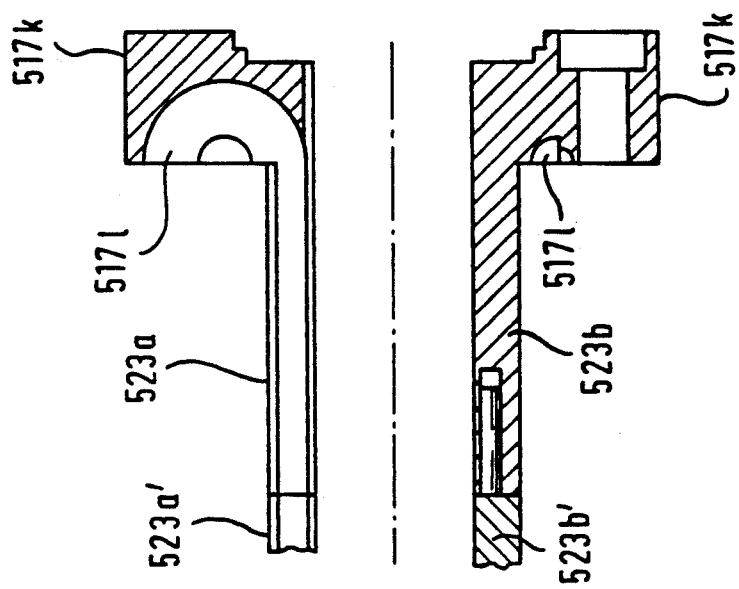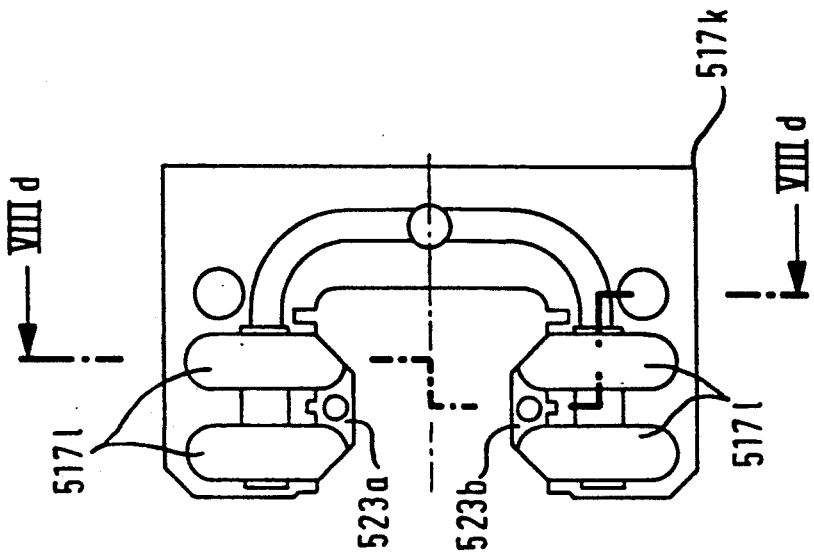

LINEAR GUIDING AND DRIVING UNIT

CROSS-REFERENCE TO RELATED APPLICATION

This is a division of application Ser. No. 07/428,638, filed Oct. 30, 1989, now U.S. Pat. No. 5,097,716.

BACKGROUND OF THE INVENTION

This invention relates to a linear guiding and driving unit, comprising a single rail track having a longitudinal axis and a longitudinal plane of symmetry containing this axis, a guide carriage disposed on the rail track symmetrically about the longitudinal plane of symmetry and guided by roller guide means symmetrical about the longitudinal plane of symmetry, cross-members disposed at the ends of the rail track and a single drive device extending between the cross-members and having a drive element movable parallel to the direction of the longitudinal axis, which drive element is in driving engagement with the guide carriage outside the longitudinal axis.

THE PRIOR ART

A linear guiding and driving unit of this class is known, for example, from a prior disclosure from a brochure "FESTO-PNEUMATIK I". In this known form of construction, a U-shaped guide carriage is guided on the rail track by rollers which are journalled rotatably on the guide carriage.

OBJECT OF THE INVENTION

The objective of the present invention is, in a linear guiding and driving unit of the initially named type, that is to say in a linear guiding and driving unit in which the force resultant of the drive device lies outside the longitudinal axis of the rail track, to ensure that larger drive forces can be transmitted without adverse effects upon the quality of guidance and that the tilting moments which inevitably occur in the guide are rendered harmless.

SUMMARY OF THE INVENTION for achieving this objective, it is proposed according to the present invention that the rail track shall be constructed, on each side of the longitudinal plane of symmetry, with two ball rolling tracks spaced apart in a direction perpendicular to the longitudinal axis and parallel to the longitudinal plane of symmetry, each of them for one row of supporting balls of two ball circuits of the guide carriage disposed on each side of the longitudinal plane of symmetry, the planes of force transmission associated with the rows of supporting balls on one side of the plane of symmetry diverging towards the longitudinal plane of symmetry and each making, with this plane, an angle of 30° to 60°, preferably approximately 45°.

A ball guide of this type for the guide carriage on the rail track is known from DE-OS 35 27 886.

It has been found that by the use of such a ball guidance of the guide carriage on the rail track, particular advantages in respect to the quality of guiding can be achieved when the force resultant of the drive device lies outside the longitudinal axis of the rail track and therefore increased tilting moments on the carriage guide must be expected.

As already known from the above-mentioned DE-OS 35 27 886, the guide carriage may be substantially U-shaped as viewed in a cross-section perpendicular to the longitudinal axis, with a web part and two flange parts, two ball circuits being disposed at each of the flange parts.

The position of the drive device relative to the rail track may vary within wide limits. Frequently, a form of embodiment will be selected, in which the drive device is disposed at a distance from the longitudinal plane of symmetry laterally of one flange part of the guide carriage.

Such a form of embodiment is of especial interest when a low overall height of the linear guiding and driving unit above a beam surface which carries the rail track is required. The overall height can then be still further reduced by the drive device being housed within the height zone of the guide carriage.

The lateral arrangement of the drive device can be realized in a simple manner by mounting on the web of the guide carriage an entraining unit having a substantially L-shaped profile as viewed in cross-section perpendicular to the longitudinal axis, which bears with one arm on the web part of the guide carriage and bears with a further arm, subjected to the action of the drive unit, upon one of the flange parts of the guide carriage.

The drive devices may have different forms of construction. Thus, it is possible that a rotatable threaded spindle may extend between the two cross-members and that a ball nut be housed in the further arm of the entraining unit, which ball nut is in thread-like engagement with the threaded spindle by balls guided in a closed track inside the ball nut. The ball nut may be inset in a recess of one end surface of the further arm perpendicular to the longitudinal axis.

It is furthermore possible for a loop of a flexible drive means in the form of a chain, of a toothed belt or the like, to extend between the two cross-members, and for one side of this loop to be connected with the further arm of the entraining unit, generally in such a way that, in the second arm of the entraining unit, a tunnel extending in the longitudinal direction is disposed, which accommodates both sides of the loop, the one side of the loop being connected with one boundary surface of the tunnel.

Having regard to the narrowest possible form of construction of the linear guiding and driving unit, it is also possible for the drive device to be disposed in the region of the longitudinal plane of symmetry, above the web part of the guide carriage.

This form of construction may be so arranged that a rotatable threaded spindle extends between the two cross-members and that a seating for a ball nut is mounted on the web part of the guide carriage, which nut is in threadlike engagement with the threaded spindle by balls guided in a closed track inside the ball nut. The ball nut may be inset into a recess of one end surface of the seating perpendicular to the longitudinal axis.

In the arrangement of the drive above the web it is, also, again possible for a loop of a flexible drive means in the form of a chain, a toothed belt or the like to extend between the two cross-members, and for one side of this loop to be connected with the web part of the guide carriage. The connection of the loop to the guide carriage may be effected by the provision, on the web part of the guide carriage, of a guiding and fixing block for the loop, which comprises a clamping surface for securing the one side of the loop to the web part and a tunnel for the passage of the other side of the loop.

Where the drive is disposed above the web, the returning side of the loop may also be led back underneath the rail track, such as in a base recess of a baseplate carrying the rail track. In this manner the result is achieved that the object to be driven is brought as close as possible to the longitudinal axis of the rail track; at the same time, the entire height of the rail track and, where applicable, the baseplate can be utilized for housing the return rollers of the loop. In this manner an especially compact form of embodiment with the loop largely encapsulated is achieved.

It is often required that a component is to be driven by the linear guiding and driving unit, which forms part of a machine tool or of an automatic handling installation. In order to make the connection between this component and the guide carriage, it may be arranged that fixing means for connection with a component to be driven are mounted on the first arm of the entraining component or on the seating or on the guiding and fixing block, as the case may be. The fixing means may here comprise fitting surfaces for the form-fitting, locatable bearing of the component to be driven.

In order to avoid distortions in the linear and driving unit, it is desired to locate the drive device in its position relative to the rail track as exactly as possible. This can be achieved by the end cross-members being locatably mounted on end portions of the ball rolling tracks of the rail track. It is recommended in this connection that the end cross-members be secured to the rail track by means of fixing screws passing through the rail track. Such fixing screws secure the end cross-members of the rail track without any deformation of the end cross-members, so that the position of the drive device is independent of the tightening forces that are applied when the fixing screws are fitted.

It should also be mentioned at this point that the positional location of the drive device relative to the rail track is of especial importance when a spindle drive, such as a ball spindle drive, is used as drive device.

In order to make possible easy installation of the linear guiding and driving unit in a larger assembly, such as a machine tool or handling installation, it is proposed that the rail track shall have a seating surface for resting upon a beam and fixing bores, extending perpendicularly to this seating surface, for receiving fixing bolts which hole the rail track on the beam.

In order here to prevent contact of the end cross-members and of the guide carriage with the seating surface, even where the width of the seating is wider than the rail track, it is proposed that the end cross-member and/or the guide carriage be set back with respect to the seating surface.

The invention furthermore relates to a linear guiding and driving unit, comprising at least one rail track, a guide carriage guided on the rail track by means of roller guide means and a drive device extending parallel to the rail track outside its axis and having a drive element, which is accommodated in a drive element casing formed in one piece with the guide carriage, the roller guide means being formed of rows of supporting balls of at least two ball circuits mounted on the carriage and each of these rows of supporting balls being in engagement with a ball rolling track at the rail track side and a ball rolling track at the carriage side.

Such a linear guiding and driving unit is known from a brochure "Star-Schienenführungstische" ("Star Rail Guide Tables") having Printed Matter No. 120-0/1/88/6 Bi. In this known linear guiding and driving unit, a carriage is guided on two mutually parallel rail tracks, which are laid on one common baseplate. For guiding the guide carriage, several U-shaped guide bodies are fixed to this carriage by bolting, and in these the circulating rows of balls are housed. Between the two rail tracks a guide body, penetrating between the rail tracks, is integrally formed on the carriage, in which guide body a ball nut is incorporated. The ball nut is in engagement with a threaded spindle, which extends between the two rail tracks from one end to the other of the baseplate. The threaded spindle is rotatably mounted on cross-members at the ends of the baseplate and can be connected with a rotary drive.

A disadvantage in this known form of construction is that the guide bodies for the ball circuits are formed of separate components, which must be fixed to the carriage by screws.

The objective of the present invention is, starting from this state of the art according to the aforementioned brochure "Star-Schienenführungstische" ("Star Rail Guide Tables"), to make a still more compact linear guiding and driving unit, which has high wear resistance, irrespective of the material of the guide carriage.

For achieving this objective, it is proposed that at least one guide body for the ball circuits shall be constructed also in one piece with the carriage and that, for forming the ball rolling tracks at the carriage side, at least one steel insert shall be set in the guide body, in which insert at least one ball rolling track of the carriage side is formed or moulded.

The linear guiding and driving unit according to this invention is simple and economical to manufacture, because the carriage is formed in one piece with the guide body and the drive element casing and therefore subsequent adjustment and fixing of guide bodies is not necessary.

In the selection of the material for the carriage, there is considerable freedom, because the ball rolling tracks are integrally formed on steel inserts which offer the necessary wear resistance. These steel inserts may be replaced if necessary, so that the carriage possesses a long working life, even through the steel inserts subjected to the greatest wear should prematurely become unserviceable.

The guide carriage may, together with the drive element casing and the guide body, be formed from an extruded profile, so that the production is still further simplified. In the production of this extruded profile, the recesses in the guide body and in the drive element casing may already be largely produced during the course of extrusion, so that chip-removing machining is only necessary to a limited extent.

Since the ball rolling tracks are formed on the steel inserts, the guide carriage may, if the expected loadings permit this, be made for example from aluminium, without risk of premature wear being expected.

The drive device may be varied in this form of embodiment also between wide limits, in particular belt drives, spindle drives and pneumatic or hydraulic cylinder-piston units may be employed for the drive. Preferred drives are ball and thread drives, in which the ball nut is in thread-like engagement with the threaded spindle by balls guided in a closed track inside the ball nut.

Another, also advantageous method of driving is based upon the drive element casing being connected with one side of a belt drive, which extends parallel to the longitudinal axis of the rail track between two cross-members, which are disposed in the end zones of the rail track. The two sides of the belt drive may be passed through a passage in the drive element casing, the one side of the belt drive being firmly connected inside the passage to the drive element casing, while the other side passes freely through the passage.

The guide body may be of U-shape, as basically known from the aforementioned brochure "Star-Schienenführungstische", two rows of supporting balls, each of two ball circuits, being disposed between the two flanges of the U-shaped guide body and the lateral surfaces of the rail track adjacent to these flanges. The drive element casing may here be disposed laterally along-side one flange of the U-shaped guide body or above the web of the U-shaped guide body.

The carriage may carry a very wide variety of functional devices, for example functional devices of a machine tool. For this reason it is proposed that the carriage shall be constructed with a clamping surface and clamping means for adding-on an extension piece.

To enable errors of alignment to be compensated, the steel inlays in the guide body can be journalled so that they can rock about an axis perpendicular to the longitudinal axis of the rail track, this rocking axis lying in the region of the longitudinal centre of the relevant row of supporting balls.

For further simplification, where two adjacent ball circuits are used, it is proposed that each two ball rolling tracks at the carriage side shall be formed on one common steel insert. It is possible here for the rows of supporting balls belonging to one common steel insert to be secured in the associated ball rolling tracks of the common steel insert by one common holding bar unit. This holding bar unit may also undertake, as well as the securing of the balls on the steel insert, the securing of the steel insert also in the guide body. The holding bar unit may be a part of at least one end plate fixed to the guide body, in which return guides for the relevant ball circuits are formed.

The holding bar units are each so constructed that they permit rocking of the steel inserts about an axis perpendicular to the axis of the rail track and/or about an axis parallel to the axis of rail track. For this purpose it is recommended that, where the holding bar is of hard-elastic material, the steel inserts shall be held by the holding bar units with a certain movement clearance. In the case of soft-elastic holding bar material, the rocking capability could be made possible also by the elastic deformability of the holding bar material.

If two ball rolling tracks at the carriage side are disposed on a common steel insert, it may also be advantageous to journal the common steel insert so that it can rock about an axis parallel to the axis of the rail track.

The attached figures explain the invention by reference to examples of embodiment thereof: the figures show:

BRIEF DESCRIPTION OF THE DRAWINGS

FIG. 8a is a diagrammatic top view of a linear guiding and driving unit as shown in FIG. 8, in the direction of the arrow 8a of FIG. 8;

FIG. 8b is a cross-sectional view according to line VIIIB—VIIIB of FIG. 8a;

FIG. 8c is an end view in the direction of the arrows VIIIC—VIIIC of FIG. 8 of an end plate as shown in FIG. 8a, this end plate being in FIG. 8c separated from the remaining of the linear guiding and driving unit;

FIG. 8d is a section according to line VIIID—VIIID;

FIG. 8e is an end view of the end plate according to arrows VIIIE—VIIIE of FIG. 8a;

DESCRIPTION OF THE PREFERRED EMBODIMENTS

Figure 1:
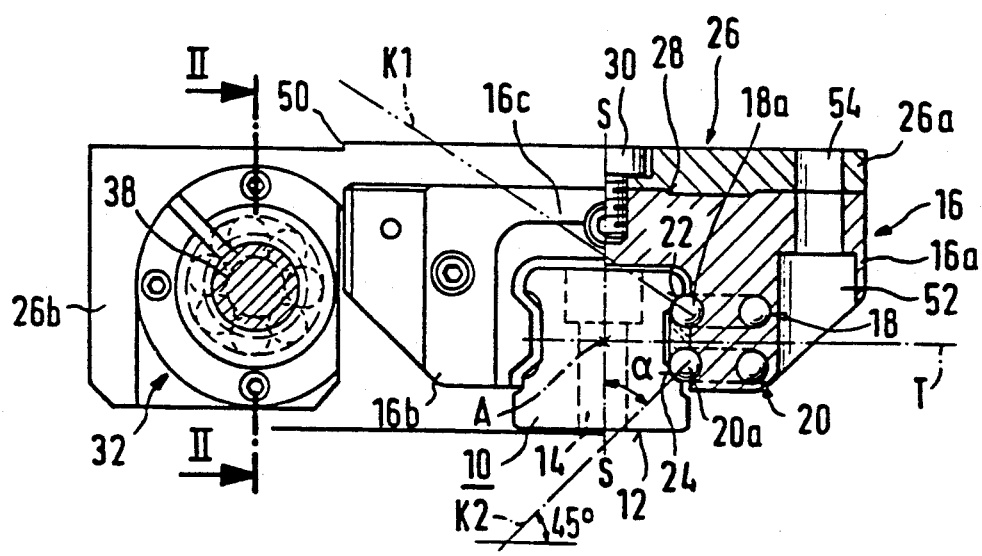
FIG. 1 a cross-section through a linear guiding and driving unit according to this invention, with ball spindle drive in the region of the guide carriage, the ball spindle drive being arranged laterally of the guide rail.
Figure 1A:
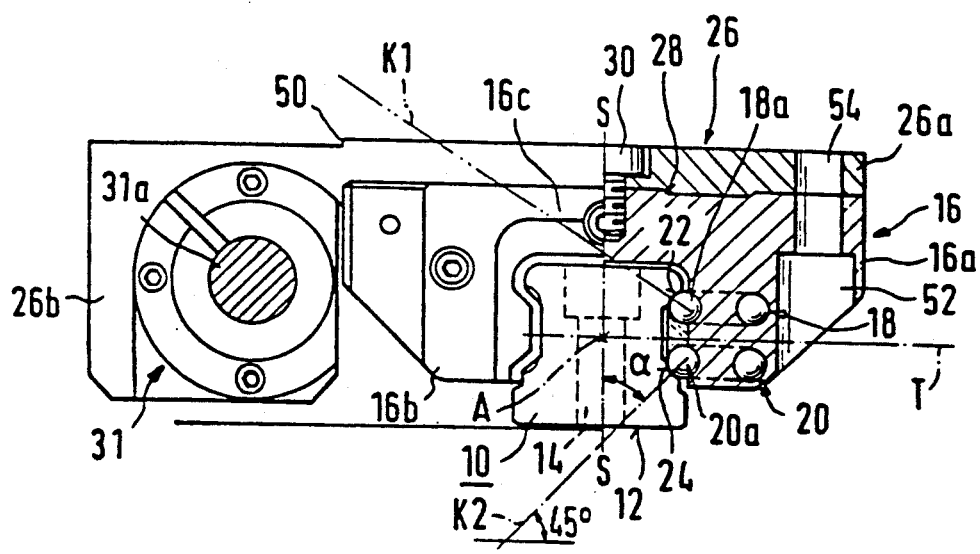
FIG. 1A, a cross-section through a linear guiding and driving unit according to this invention and as depicted in FIG. 1, further having a pneumatic drive (31a)
Figure 2:
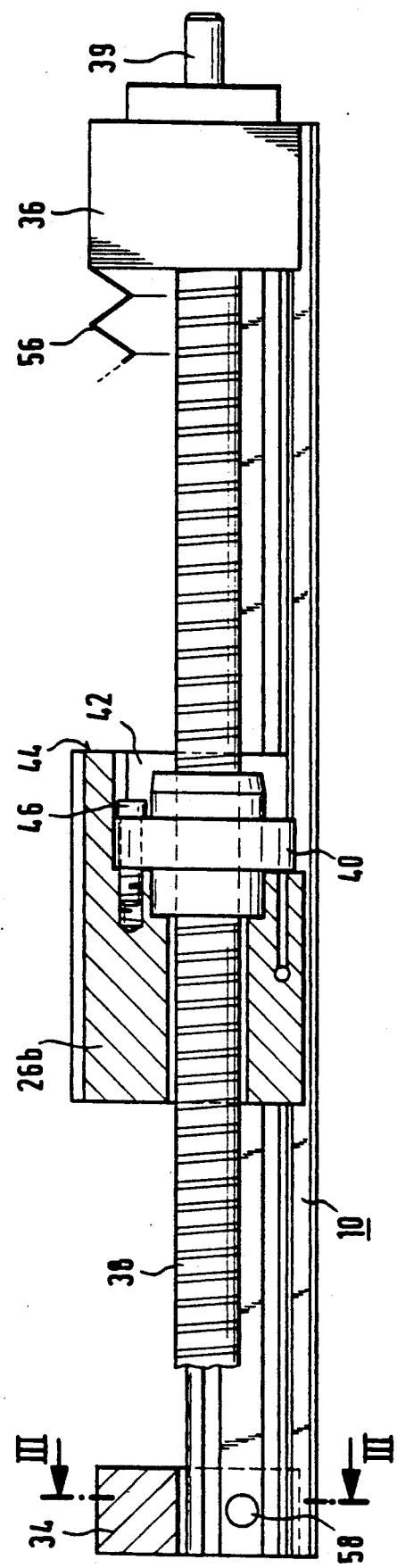
FIG. 2 a section on the line II—II of FIG. 1.

In FIG. 1, a rail track is reference 10. This rail track is formed of a single profiled rail in one piece, which possesses a seating surface 12 for seating on a beam surface and can be secured to this beam surface by means of bolts, which pass through bores 14 of the rail track 10. On the rail track 10, a U-shaped guide carriage 16 is guided, which possesses two flanges 16a and 16b and a web 16c. In each of the flanges 16a and 16b, two ball circuits 18 and 20 are accommodated. The supporting rows of balls 18a and 20a of these ball circuits 18, 20 each bear against a ball rolling track 22, 24 respectively of the rail track 10. What has been stated about the arrangement of the ball circuits 18 and 20 applies also for other ball circuits, which are accommodated in the flange 16b, symmetrically to the arrangement in the flange 16a. The longitudinal plane of symmetry of the rail track 10 is referenced S—S. The axis of the rail track 10 is referenced A. A plane T perpendicular to the longitudinal plane of symmetry S—S passes through the axis A. The force transmission planes of the rows of supporting balls 18a and 20a are referenced K1 and K2. These force transmission planes make an angle α with the longitudinal plane of symmetry, which in the example is approximately 45° and may vary between about 30° and about 60°. For greater details about the ball circuits 18 and 20, reference should be made to DE-OS 35 27 886. On the web 16c of the guide carriage 16, an L-shaped entraining unit 26 is fixed. A first L-flange 26a of this entraining unit 26 bears on the web 16c of the guide carriage 16 and is located in a form-fittingly secured desired position relative to the web 16c by edges 28. Bolts 30 serve for fixing. In a further flange 26b of the entraining unit 26, the connection of the guide carriage 16 to a drive device, namely a ball and thread drive 32, is made, for the explanation of which reference will now be made to FIG. 2. In FIG. 2 it can be seen that at each end of the rail track 10 an end cross-member 34, 36 is mounted. In these end cross-members 34, 36 a threaded spindle 38 is journalled rotatably and axially immovable, of which one end 39 is constructed for coupling to a drive motor, for example a stepping motor. This threaded spindle 38 is in engagement with a ball nut 40, which is housed in a recess 42 of an end face 44 of the flange 26b and is secured there by means of bolts 46. For the construction of the ball and thread drive consisting of the threaded spindle 38 and the ball nut 40, reference should be made to the following publications:

DE-PS 28 05 141,
DE-PS 28 34 299,
DE-PS 29 14 756.

Figure 3:
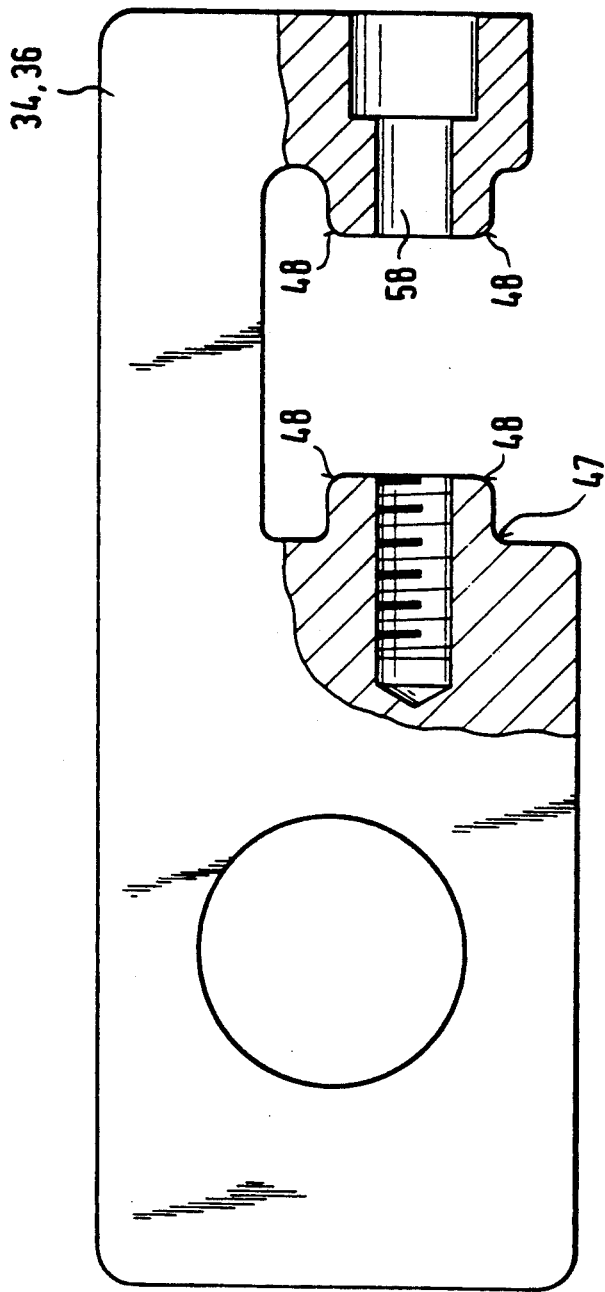
FIG. 3 a section through an end cross-member on the line III—III of FIG. 2, the end cross-member having been removed from the rail track.

For the arrangement of the cross-members 34, 36 on the rail track 10, reference is now made to FIG. 3. These cross-members 34, 36 have a profiled cut-out 47, with rounded engagement corners 48, intended for engagement in the ball rolling tracks 22, 24. In this way the threaded spindle 38 is exactly positioned with respect to the rail track 10.

On the guide carriage, a component to be driven may be fixed. This component is placed on the flange 26a and adjusted by locating edges 50. For securing it, bolts are used, which pass through bores 52 in the flanges 16a, 16b and bores 54 in the flange 26a.

In FIG. 2, a covering bellows 56 can be seen, which extends between the two cross-members 34, 36 and the assembly consisting of guide carriage 16 and entraining unit 26, so that fouling of the threaded spindle 38 and rail track 10 is prevented.

The fixing of the cross-members 34, 36 on the rail track 10 is effected by bolts, which are screwed into bores 58 of the cross-members and pass through associated bores of the rail track 10.

Figure 4:
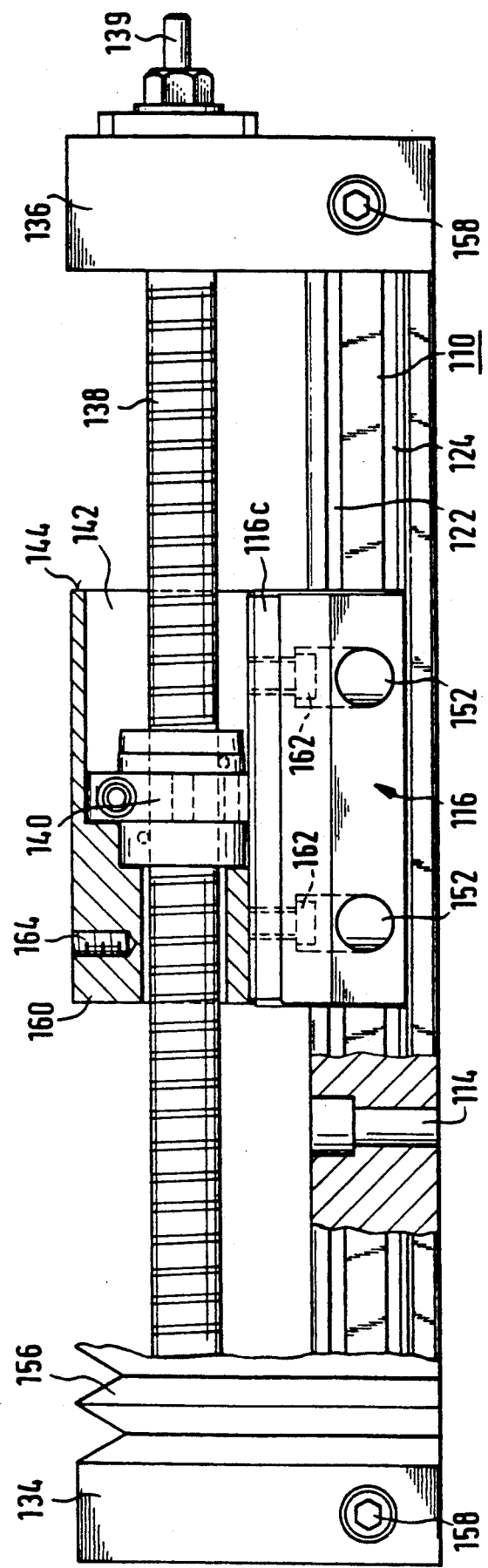
FIG. 4 a longitudinal section through a form of embodiment, in which a ball spindle drive is disposed in the longitudinal central plane of the rail track on the upper side of the web of a U-shaped guide carriage.

In FIG. 4, analogous components are given the same references as in FIGS. 1 to 3, but increased in each case by 100.

The threaded spindle 138 is here located above the web 116c of the guide carriage in the longitudinal plane of symmetry. A seating 160 for the ball nut 144 is fixed on the web 116c by bolts 162. In the seating 160, threaded bores 164 are provided, by which a component to be entrained can be fixed.

Figure 5:
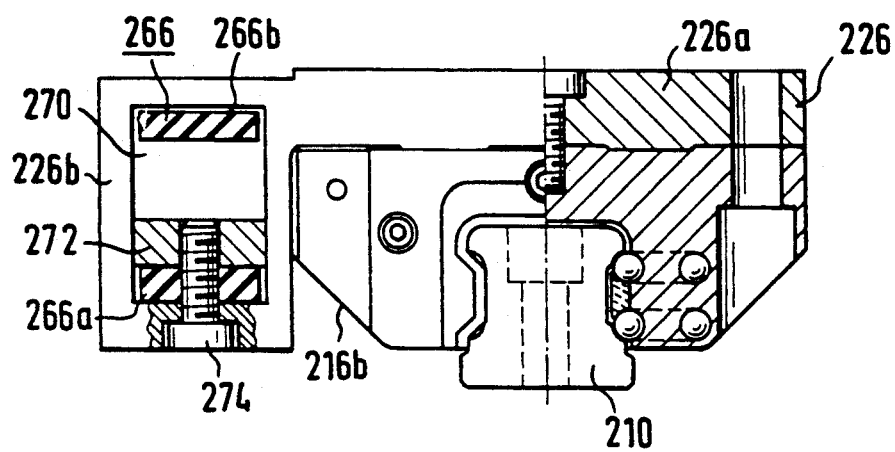
FIG. 5 a cross-section corresponding to that of FIG. 1, but with the ball spindle drive replaced by a belt drive.

In FIG. 5, analogous components are given the same references as in FIGS. 1 to 3, but increased by 200. In this form of embodiment, a belt drive is provided as drive device, and is referenced 266. The belt drive 266, for example a toothed belt drive, is formed of a belt loop. The belt loop runs over a belt sheave, mounted on each of the two cross-members, not shown here. One of the belt sheaves is provided with a drive, and at least one of the belt sheaves is adjustable longitudinally of the rail track 210, in order to tension the belt. The cross-members are fixed onto the rail track in exactly the manner illustrated in FIGS. 2 and 3. The two longitudinal portions of the belt loop run through a tunnel 270 of the flange 226b. The one longitudinal section 266a of the belt loop is firmly clamped by a clamping plate 272 and clamping bolt 274 to the flange 226b, while the other longitudinal portion 266b passes freely through the tunnel 270.

Figure 6:
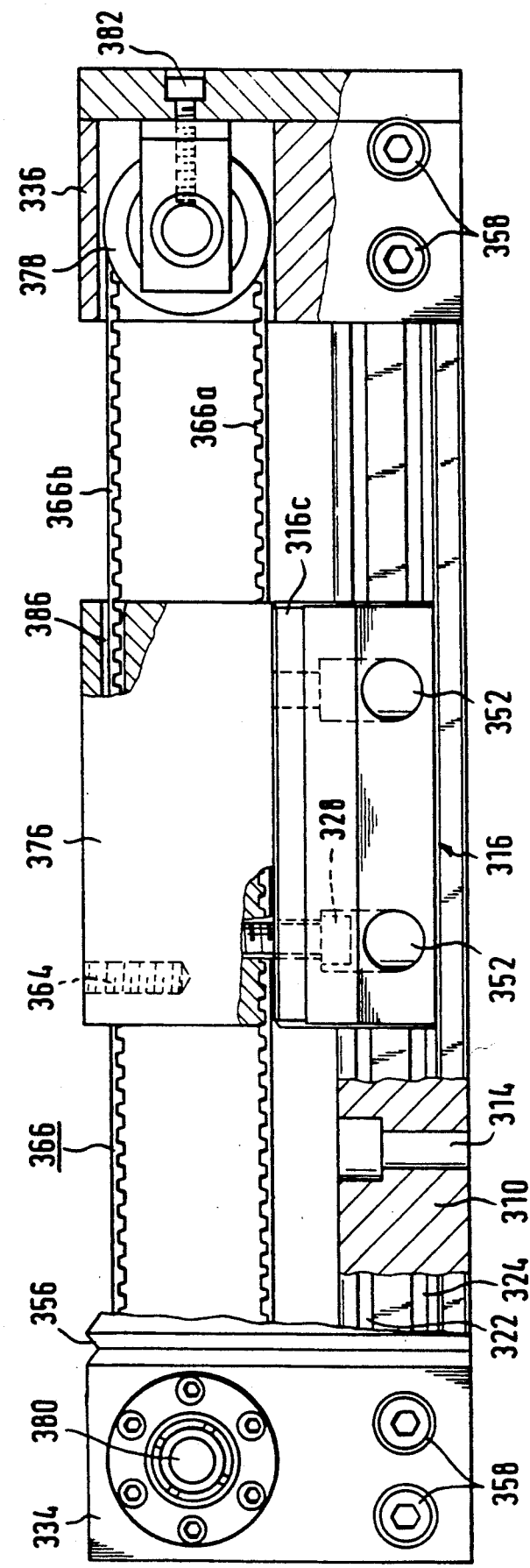
FIG. 6 a longitudinal section corresponding to that of FIG. 4, but with the ball spindle drive replaced by a belt drive.

In FIG. 6, analogous components are given the same references as in FIGS. 1 to 3, but increased by 300. On the web 316c of the guide carriage 316, a guiding and fixing block 376 is screwed on by means of bolts 328. In the cross-members 334, 336, belt sheaves 378 are journalled by bearings 380. A stepping motor is associated with one of these belt sheaves. The belt sheave 378 is adjustable by a tensioning screw 382 in the longitudinal direction of the rail track 310. A toothed belt 366 runs around the belt sheaves 378 and lies in the longitudinal plane of symmetry of the rail track 310. The lower longitudinal portion 366a of the toothed belt 366 is clamped between the web 316c and the guiding and fixing block 376 by means of the bolts 328. The upper longitudinal portion 366b of the toothed belt loop 366 passes through a tunnel 386 of the guiding and fixing block 376. In the guiding and fixing block, threaded bores 364 are provided, so that a component to be entrained can be fixed to the guiding and fixing block.

If a pneumatic unit is used, this can be mounted either in the installation arrangement according to FIGS. 1 and 2 or in the installation arrangement according to FIG. 4. The pneumatic unit itself can be constructed in the conventional manner from a cylinder-piston unit, a piston rod acting with its outer end on the guide carriage and the cylinder by its base on one of the cross-members, or vice versa. The piston can be loaded on both faces with a pressurized fluid. It is, however, also conceivable to use a continuous cylinder from cross-member to cross-member, and to move inside this cylinder a piston having no piston rod by pressurized fluid applied to both faces, and to provide entraining means of mechanical or magnetic type active through the cylinder.

The linear guiding and driving unit according to this invention has, in conjunction with its simple construction and a low space requirement. The guide carriage can be heavily loaded; it can be moved along the rail track free of twist, exactly and with easy running. A high positional accuracy is assured even at a high speed of travel. It is assembled from a few, economically manufactured components.

Figure 7:
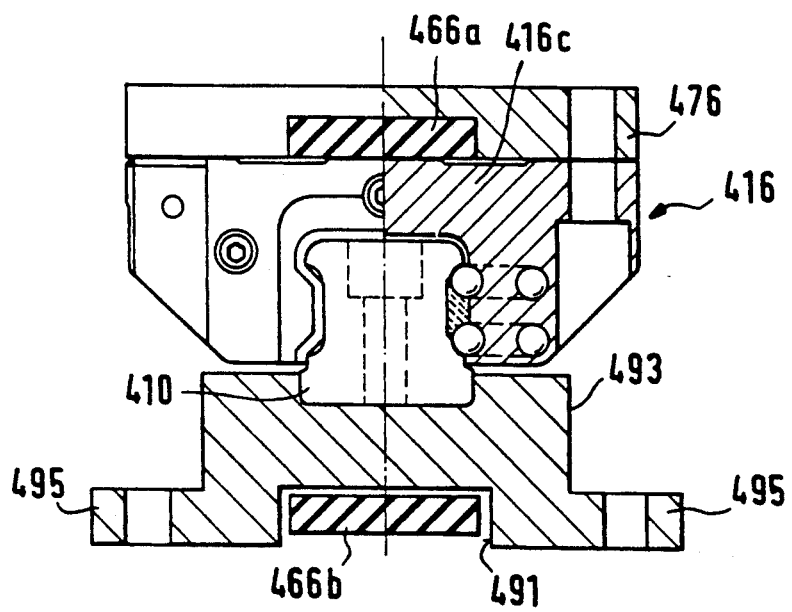
FIG. 7 a variant of the form of embodiment of FIG. 6, but seen in cross-section.

In FIG. 7, a variant of FIG. 6 is illustrated in cross-section: the loop is here clamped with its driving, upper side 466a between a relatively thin clamping plate 476 and the web 416c of the guide carriage 416. The returning, lower side 466b of the loop runs in a tunnel 491 of a bearing plate 493, to which the rail track 410 is secured. The baseplate 493 is provided with foot flanges 495, which can be secured by bolts to a beam or support.

Figure 8:
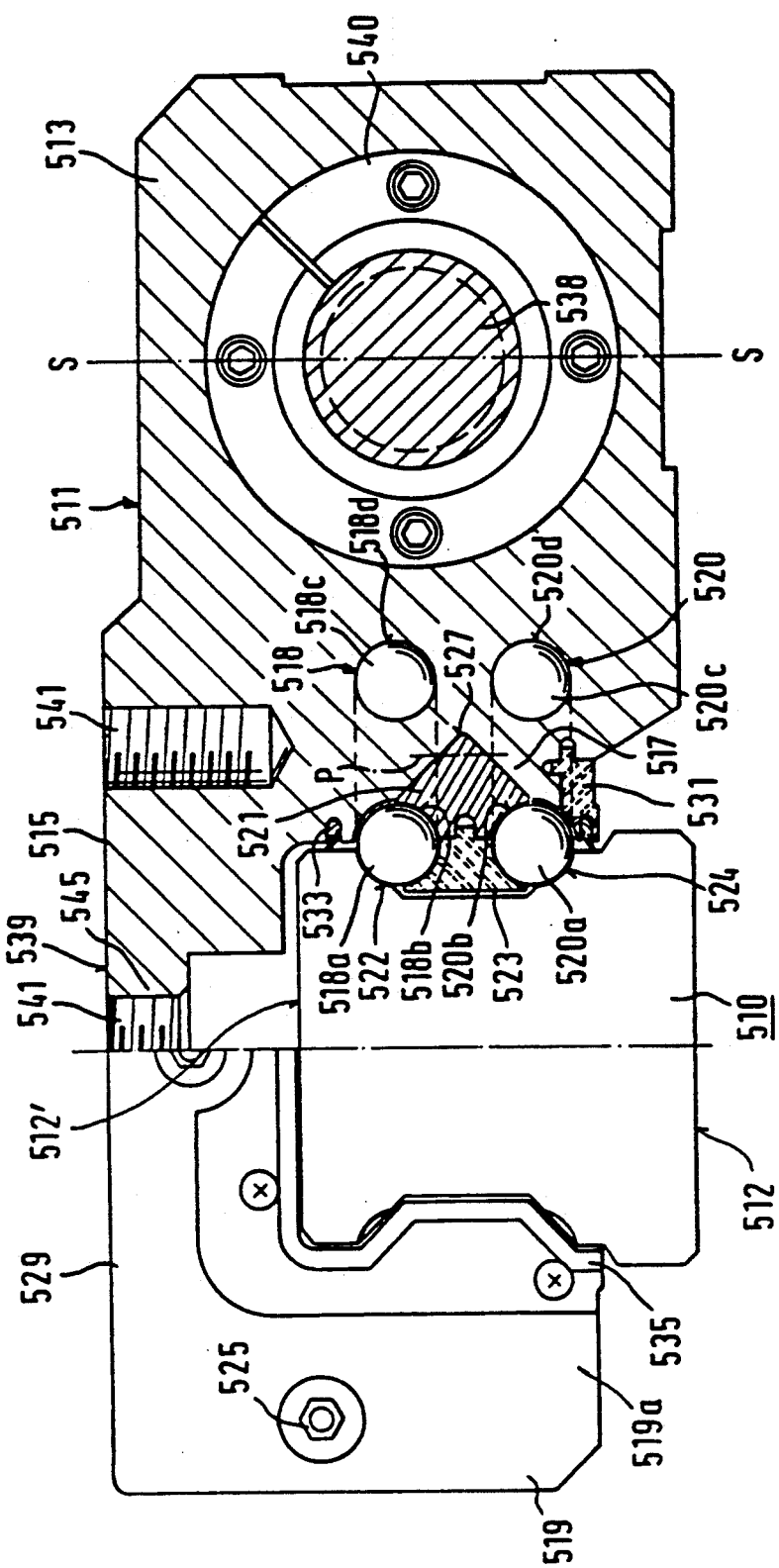
FIG. 8 a variant of the form of embodiment according to FIG. 1, in which a drive element casing and a guide body are constructed in one piece with the carriage, a ball and thread drive serving as the drive.
Figure 8B:
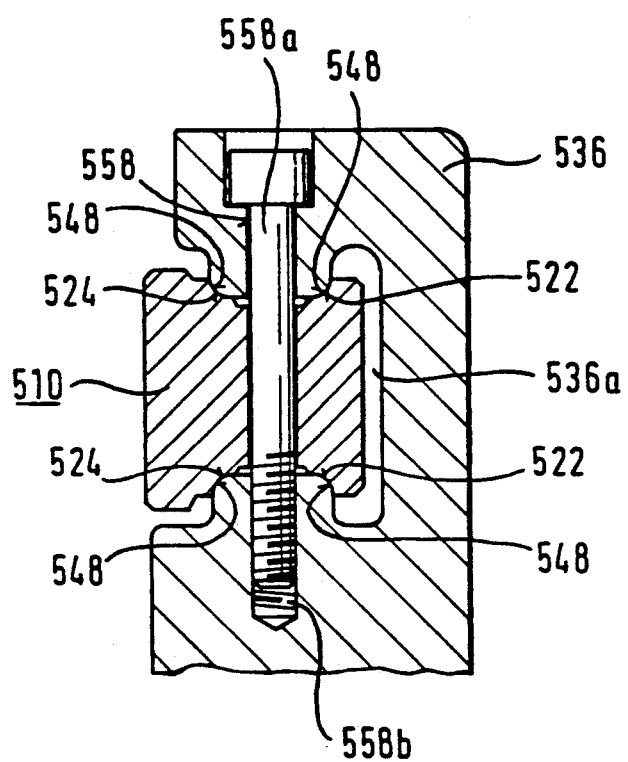
Figure 8F:
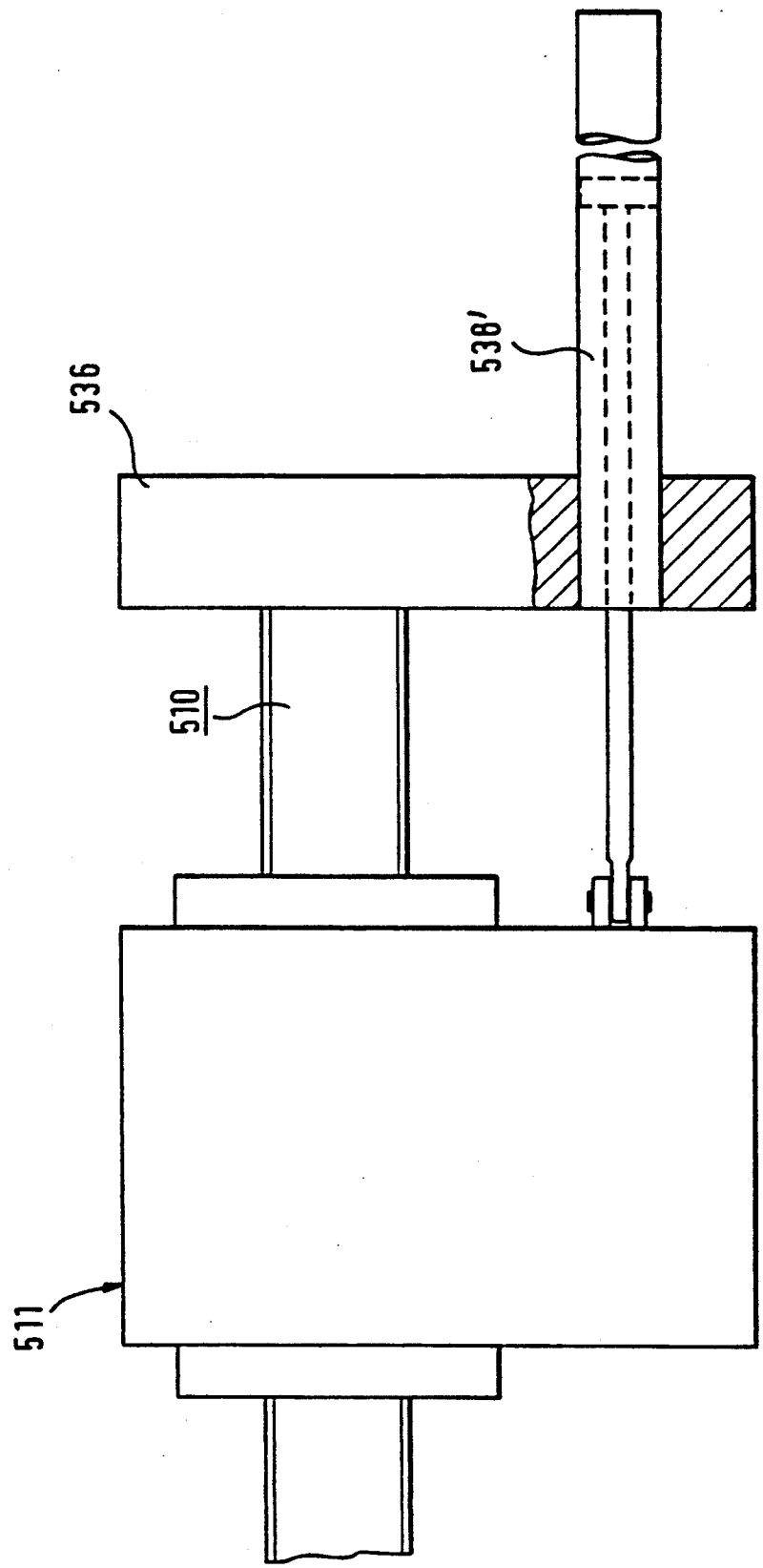
FIG. 8f is a top view similar to the top view of FIG. 8a with a fluid-operated drive unit.

In FIG. 8, a linear guiding and driving unit is illustrated, which has similarity to the form of embodiment of FIG. 1. A guide carriage is here referenced quite generally 511. This guide carriage comprises a drive element casing 513 and a guide body 515. The guide body 515 is of U-shape and is guided on a rail track 510. In each of the two flanges 517 and 519 of the U-shaped guide body 515, two ball circuits 518 and 520 are housed, only the ball circuits of the right-hand U-flange 517 being illustrated. Each of these ball circuits 518 and 520 comprises a row of supporting balls 518a and 520a respectively. The rows of supporting balls 518a, 520a are guided in a ball rolling track 522 and 524 respectively at the rail side. The carriage-side ball rolling tracks 518b, 520b are formed in a steel insert 521, which is mounted in the guide body 515, in its U-flange 517, and able to rock about a rocking axis P. The steel insert 521 is made of steel, especially hardened steel. The rows of supporting balls 518a and 520a are secured in the carriage-side ball rolling tracks 518b and 520b by a holding bar unit 523. The holding bar unit is formed of two half-bars, which abut each other in the longitudinal centre of the guide body 515 and are centred there against each other. These half-bars depart from end plates, which are fitted on the end surfaces of the guide body 515 perpendicular to the rail axis. One of these end plates is illustrated in the left half of FIG. 8 and referenced 529. These end plates are secured to the guide body 515 by screws 525. The half-bars are each connected in one piece with the end plates 529. For further details about the end plates and half-bars, reference is made to DE-OS 35 27 886. The holding bar unit 523 serves, in addition to securing the rows of supporting balls 518a and 520a in the ball rolling tracks 518b and 520b, also for securing the steel inserts 521 in a recess 527 of the guide body 515. Longitudinal sealing strips 531, 533 and end sealing elements 535 serve for sealing the ball circuits 518 and 520.

For the returning rows of balls 518c, 520c, returning ball ducts 518d, 520d are drilled in the guide body 515. In the end plates 529, as illustrated in greater detail in DE-OS 35 27 886, change-direction guides between the rows of supporting balls 518a, 520a and the return rows of balls 518c and 520c are formed.

Parallel to the rail track 510, there runs a threaded spindle 538, on which a ball nut 540 is seated. The threaded spindle 538 and ball nut 540 are in engagement with each other by an endless row of balls, as is known from German Patent Specifications 28 05 141, 28 34 299 and 29 14 756.

The carriage 511 is extruded in one piece together with the drive element casing 513 and guide body 515 from aluminum. The important cavities in the drive element casing 513 and guide body 515 are produced in the extrusion operation itself and basically only those surfaces that do not run in a straight line over the entire length of the guide body 515 need to be produced by machining.

The guide carriage 511 comprises a clamping surface 539, on which an extension piece can be secured, for example by means of threaded bolts, which are screwed into threaded bores 541 of the guide carriage 511.

It should be pointed out here that the linear guiding and driving unit could also be made symmetrical about the axis S—S, by the provision of a guide body 515 on each side of the threaded spindle 538.

Figure 9:
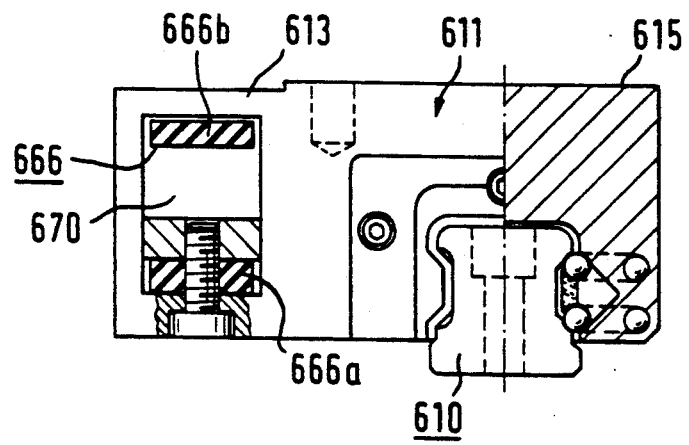
FIG. 9 a variant of FIG. 5, in which the drive element casing and the guide body are manufactured in one piece with the carriage and a belt drive is provided as drive means.

In the form of embodiment according to FIG. 9, the carriage generally is referenced 611. It comprises a guide body 615 and a drive element casing 613. For the construction of the guide body 615 and ball guides, what was stated in relation to FIG. 8 applies. The guide element casing 613 is here constructed with a passage 670, through which both sides 666a and 666b of a belt drive 666 pass. The one belt side 666a is clamped to the drive element casing 613, while the belt side 666b passes freely through the passage 670. The belt drive 666 extends along the rail track 610 and is guided at each end of the rail track 610 over rollers, of which one is provided with a drive.

Figure 10:
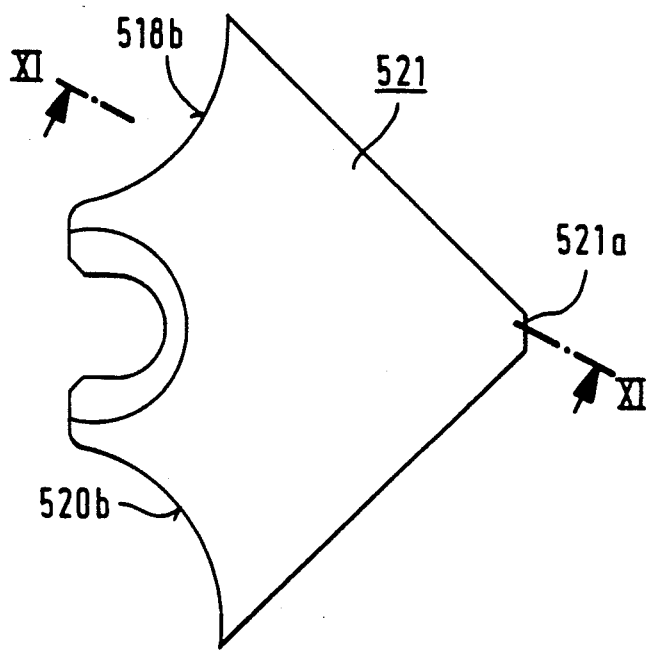
FIG. 10 an end elevation of a steel insert 521 according to FIG. 8.
Figure 11:
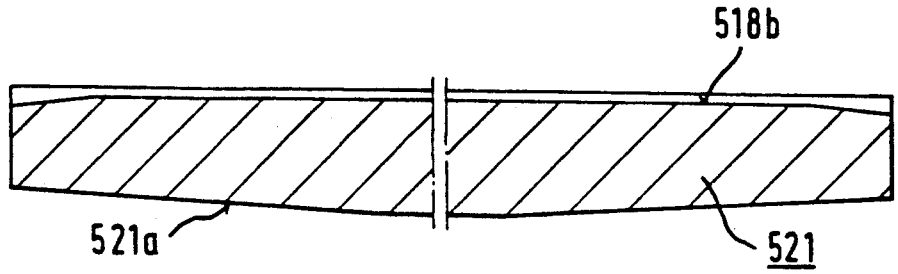
FIG. 11 a section on the line XI—XI of FIG. 10.

In FIGS. 10 and 11, a form of the steel insert 521 can be seen, in which the back 521a is rounded in such a manner that the steel insert can rock about the rocking axis P.

Figure 12:
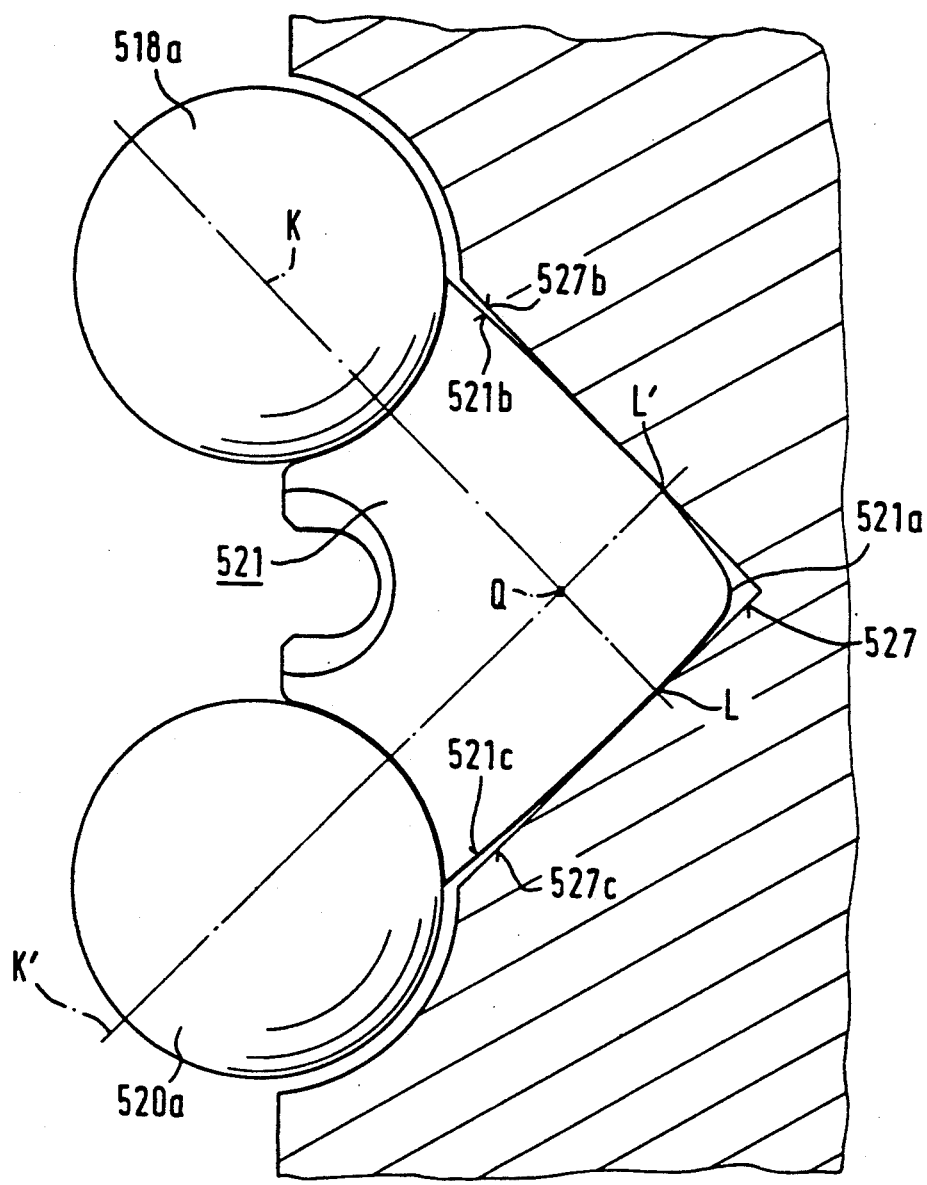
FIG. 12 a varied form of embodiment of the steel insert corresponding to the view according to FIG. 10.

In the form of embodiment according to FIG. 12, the bearing surfaces 521b and 521c are in addition convex in such a way that the steel insert 521 can rock about the axis Q, parallel to the longitudinal direction of the rail. The two possibilities of rocking, about the rocking axis P according to FIG. 8 and about the rocking axis Q according to FIG. 12, can be combined with each other. In this case, the contact lines L and L' of the bearing surfaces 521b and 521c on the bearing surfaces 527b and 527c become contact points.

By the facility for rocking about the axis Q parallel to the rail, assurance is in any case provided that the force transmission planes K and K' of the rows of balls 518a and 520a pass through the contact lines or contact points respectively L and L'.

We claim:

1. Linear guiding and driving unit, comprising a rail track (510) having a longitudinal axis and a longitudinal plane of symmetry containing said longitudinal axis, a seating surface, a top face remote from said seating surface and two side faces on both sides of said plane of symmetry, and a U-shaped guide carriage (515) rollingly guided on said rail track (510), said U-shaped carriage (515) having, when viewed in a cross section perpendicular to said longitudinal axis, a web part opposite to said top face and two flange parts (517,519) opposite to the respective side faces, said U-shaped guide carriage (515) being guided on said rail track (510) by at least two circuits (518,520) of rolling bodies on both sides of said plane of symmetry, each circuit (518,520) of rolling bodies having one load supporting linear row (518a,520a) of rolling bodies engaging both a rolling track (522,524) of said rail track (510) and a rolling track (518b,520b) of said U-shaped guide carriage (515), said rail track (510) being connected adjacent at least one end thereof with a cross member, linear driving means (538,540) extending between said U-shaped guide carriage (515) and said at least one cross member for moving said guide carriage (515) along said rail track (510), with respective load supporting linear rows (518a,520a) of both circuits (518,520) provided on each side of said plane of symmetry being supported on the respective flange part (517,519) by a common steel insert (521), said common steel insert (521) being supported by the respective flange part (517,519).

2. Linear guiding and driving unit as set forth in claim 1, said steel insert (521) being movable with respect to the respective flange part (517,519) about at least one of a rocking axis (Q) parallel to said longitudinal axis and a rocking axis (P) perpendicular to said longitudinal axis and substantially parallel to a plane defined by the axes of the respective load supporting linear rows (518a, 520a).

3. Linear guiding and driving unit as set forth in claim 2, said steel insert (521) having rounded tilting faces (521a,521b,521c) movably engaged with respective bearing surfaces (527b,527c) of a respective recess (527) of the respective flange part (517,519) accommodating the respective common steel insert (521).

4. Linear guiding and driving unit as set forth in claim 1, an entraining unit (513) being integral with said guide carriage (515) and adapted for connection to said linear driving means (538,540).

5. Linear guiding and driving unit as set forth in claim 4, said entraining unit (513) being integral with one (517) of said flange parts (517, 519) of said U-shaped guide carriage (515).

6. Linear guiding and driving unit as set forth in claim 4, said entraining unit (513) being integrally extruded with said guide carriage (515).

7. Linear guiding and driving unit as set forth in claim 4, said carriage (515) being made of light metal.

8. Linear guiding and driving unit as set forth in claim 5, said entraining unit (513) being located laterally in a direction perpendicular to the longitudinal plane of symmetry of said one flange part (517) and the respective side face of said rail track (510).

9. Linear guiding and driving unit as set forth in claim 1, said cross members (34, 36) having rolling track engagement faces (48) engaging said rolling tracks (522, 524) of said rail track (510).

10. Linear guiding and driving unit as set forth in claim 4, said linear driving means (538, 540) comprising a threaded spindle (538) and a nut (540), said threaded spindle (538) being parallel to the rail track (510), the nut (540) being accommodated within said entraining unit (513).

11. Linear guiding and driving unit as set forth in claim 10, said (540) nut being a ball nut.

12. Linear guiding and driving unit as set forth in claim 10, said threaded spindle (538) being rotatably mounted in said at least one cross member.

13. Linear guiding and driving unit as set forth in claim 12, said threaded spindle (538) being provided with driving means adjacent said at least one cross member.

14. Linear guiding and driving unit as set forth in claim 4, said linear driving means comprising a fluid operated drive unit extending parallel to said rail track (510) between said entraining unit (513) and said at least one cross member.

15. Linear guiding and driving unit as set forth in claim 4, said linear driving means comprising a drive belt (666) extending along said rail track (610) between respective cross member adjacent respective ends of said rail track (610), said belt (666) being guided over rollers allocated to said cross member, said belt (666) being fastened to said entraining unit (613).

16. Linear guiding and driving unit as set forth in claim 15, said belt (666) extending through a passage (670) of said entraining unit (613).

17. Linear guiding and driving unit as set forth in claim 9, said cross member being fixed to the rail track by at least one fixing bolt to be inserted into mutually aligned bores (58) of said cross member and said rail track.

18. Linear guiding and driving unit, comprising a rail track (210) having a longitudinal axis and a longitudinal plane of symmetry containing said longitudinal axis, a seating surface, a top face remote from said seating surface and two side faces on both sides of said plane of symmetry, and a U-shaped guide carriage rollingly guided on said rail track (210), said U-shaped carriage having, when viewed in a cross section perpendicular to said longitudinal axis, a web part opposite to said top face and two flanges parts (216b) opposite to the respective side faces, said U-shaped guide carriage being guided on said rail track (210) by at least one circuit of rolling bodies on both sides of said plane of symmetry, each circuit of rolling bodies having one load supporting linear row of rolling bodies engaging both a rolling track of said rail track (210) and a rolling track of said U-shaped guide carriage, an entraining unit (266) being connected to said U-shaped guide carriage, with linear driving means defining a loop (266) of flexible drive means extending between two cross members provided adjacent respective end portions of said rail track (210), a section (226a) of said loop (266) being connected to said entraining unit (266), said loop (266) extending through a tunnel (270) of said entraining unit (266).

19. Liner guiding and driving unit as set forth in claim 18, said entraining unit (613) being integral with said guide carriage (615).

20. Linear guiding and driving unit, comprising a rail track (310) having a longitudinal axis and a longitudinal plane of symmetry containing said longitudinal axis, a seating surface, a top face remote from said seating surface and two side faces on both sides of said plane symmetry, and a U-shaped guide carriage (316) rollingly guided on said rail track (310), said U-shaped carriage (316) having, when viewed in a cross section perpendicular to said longitudinal axis, a web part (316c) opposite to said top face and two flange parts opposite to respective side faces, said U-shaped guide carriage (316) being guided on said rail track (310) by at least one circuit of rolling bodies on both sides of said plane symmetry, each circuit of rolling bodies having one load supporting linear row of rolling bodies engaging both a rolling track (322,324) of said rail track (310) and a rolling track of said U-shaped guide carriage (316), said rail track (310) being connected adjacent at least one end thereof with a cross member (334,336), an entraining unit (376) being connected to said U-shaped guide carriage (316), linear driving means (366) extending between said entraining unit (376) and said at least one cross member (334,336) for moving said guide carriage (316) along said rail track (310), said at least one cross member (334,336) having rolling track engagement faces engaging said rolling tracks (332,324) of said rail track (310) for precisely positioning said at least one member (334,336) on said rail track (310), said entraining unit (376) being located above said web part (316c) of said U-shaped guide carriage (316).

21. Linear guiding and driving unit, comprising a rail track (410) having a longitudinal axis and longitudinal plane of symmetry containing said longitudinal axis, a seating surface, a top face remote from said seating surface and two side faces on both sides of said plane of symmetry, and a U-shaped guide carriage (416) rollingly guided on said rail track (410), said U-shaped carriage (416) having, when viewed in a cross section perpendicular to said longitudinal axis, a web part (416c) opposite to said top face and two flange parts opposite to the respective side faces, said U-shaped guide carriage (416) being guided on said rail track (410) by at least one circuit of rolling bodies on both sides of said plane symmetry, each circuit of rolling bodies having one load supporting linear row of rolling bodies engaging both a rolling track of said U-shaped guide carriage (416), a loop (466a,466b) of flexible drive means extending along said axis of said rail track (410), a first section (466a) of said loop (466a,466b) extending along said axis above said top face of said rail track (410) and being connected to said guide carriage (416), a second section (466b) of said loop extending along said axis below said seating surface of said rail track (410)

within a passage (491) of a base member (493) carrying said rail track (410).

22. Linear guiding unit, comprising a rail track (510) having a longitudinal axis and a longitudinal plane of symmetry containing said longitudinal axis, a seating surface, a top face remote from said seating surface and two side faces on both sides of said plane of symmetry, and a U-shaped guide carriage (515) rollingly guided on said rail track (510), said U-shaped carriage (515) having, when viewed in a cross section perpendicular to said longitudinal axis, a web part opposite to said top face and two flange parts (517, 519) opposite to the respective side faces, said U-shaped guide carriage (515) being guided on said rail track (510) by at least two circuits (518,520) of rolling bodies on both sides of said plane of symmetry, each of said circuits (518,520) of rolling bodies having one load supporting linear row (518a,520a) of rolling bodies engaging both a rolling track (522,524) of said rail track (510) and a rolling track (518b,510b) of said U-shaped guide carriage (515), with respective load supporting linear rows (518a,520a) of both circuits (518,520) provided on each side of said plane of symmetry being supported on the respective flange part (517,519) by a common steel insert (521), said common steel insert (521) being supported by the respective flange part (517,519), said steel insert (521) being movable with respect to the respective flange part (517,519) about at least one of a rocking axis (Q) parallel to said longitudinal axis and a rocking axis (P) perpendicular to said longitudinal axis and substantially parallel to a plane defined by the axes of the respective load supporting linear rows (518a,520a).

23. Linear guiding and driving unit as set forth in claim 22, said steel insert (521) having rounded tilting faces (521a,521b,521c) movably engaged with respective bearing surfaces (527b,527c) of a respective recess (527) of the respective flange part of (517,519) accommodating the respective common steel insert (521).

24. Linear guiding and driving unit as set forth in claim 1 or 22, said web part comprising a mounting face (539) for mounting an additional member thereon.

25. Linear guiding and driving unit as set forth in claim 24, said web part being provided with mounting bores (541), said mounting bores (541) being substantially perpendicular to said mounting face (539).

26. Linear guiding and driving unit as set forth in claim 25, said mounting bores (541) being threaded mounting bores (541).

27. Linear guiding and driving unit as set forth in claim 1 or 22, said steel insert (521) having two bearing surfaces (521b,521c) in bearing engagement with respective counter bearing surfaces (527b,527c) of the respective flange part (517,519).

28. Linear guiding and driving unit as set forth in claim 27, said bearing surfaces (521b,521c) forming a wedge portion, said counter bearing surfaces (527b,527c) forming a recess within the respective flange part for receiving said portion.

29. Linear guiding and driving unit as set forth in claim 28, said bearing surfaces (521b,521c) being convex towards the respective counter bearing surfaces (527b,527c).

30. Linear guiding and driving unit as set forth in claim 1 or 22, said rolling bodies (518a,520a) being held in rolling engagement with rolling tracks (518b,520b) of said steel insert (521) by holding a bar unit (523).

31. Linear guiding and driving unit as set forth in claim 30, said holding bar unit (523) having an engagement profile engaged with said steel insert (521).

32. Linear guiding and driving unit as set forth in claim 30, said holding bar unit (523) being formed of two half bars which abut each other in the longitudinal center of the guide carriage (515).

33. Linear guiding and driving unit as set forth in claim 32, said half bars being integral with end plates, said end plates being fastened to respective end faces of the guide carriage (515).

34. Linear guiding and driving unit a set forth in claim 1 or 22, said at least two circuits (518, 520) of rolling bodies having circuit planes substantially parallel to said top face.

35. Linear guiding and driving unit a set forth in claim 1 or 22, wherein said flange parts (517, 519) have free ends located between said top face and said seating surface.

36. A linear guiding and driving unit, comprising a rail track having a longitudinal axis and a longitudinal plane of symmetry containing said longitudinal axis, a seating surface, a top face remote from said seating surface and two side faces on both sides of said plane of symmetry, and a U-shaped guide carriage rollingly guided on said rail track, said U-shaped carriage having, when viewed in a cross section perpendicular to said longitudinal axis, a web part opposite to said top face and two flanges parts opposite to respective ones of said side faces, said U-shaped guide carriage being guided on said rail track by at least one circuit of rolling bodies on both sides of said plane of symmetry, each circuit of rolling bodies having one load supporting linear row of rolling bodies engaging both a rolling track of said rail track and a rolling track of said U-shaped guide carriage, said rail track being connected adjacent at least one end thereof with a cross member, an entraining unit being connected to said U-shaped guide carriage, linear driving means extending between said entraining unit and said at least one cross member for moving said guide carriage along said rail track, said at least one cross member having rolling track engagement faces engaging said rolling tracks of said rail track for precisely positioning said at least one cross member on said rail track.

* * * * *

UNITED STATES PATENT AND TRADEMARK OFFICE
CERTIFICATE OF CORRECTION

PATENT NO. : 5,195,391
DATED : March 23, 1993
INVENTOR(S) : Barbat et al.

It is certified that error appears in the above-identified patent and that said Letters Patent is hereby corrected as shown below:

First page, Item 56, under "FOREIGN PATENT DOCUMENTS" insert between the first and second lines:
   --428680  2/1986   Fed. Rep. of Germany--;
First page, first Col., last line, "8525063" should read
   --525063--;
Col.11, line 28, "(540) nut" should read --nut (540)--;
Col.11, line 65, "flanges parts" should read --flange parts--;
Col.12, line 4, "(266)" should read --(226)--;
Col.12, line 10, "unit (266)" should read --unit (226)--;
Col.12, line 11, "unit (266)" should read --unit (226)--;
Col.12, line 12, "Liner" should read --Linear--;
Col.12, line 19, "plane" should read --plane of--;
Col.12, line 28, "plane" should read --plane of--;
Col.12, line 41, "332" should read --322--;
Col.12, line 47, "and" should read --and a--;
Col.13, line 20, "(518b,510b) should read --(518b,520b)--;
Col.13, line 37, "part of" should read --part--;
Col.14, line 2, "said portion" should read --said wedge portion--;
Col.14, line 22, "a set" should read --as set--;
Col.14, line 26, "a set" should read --as set--.

Signed and Sealed this

Twenty-fifth Day of January, 1994

Attest:

BRUCE LEHMAN

Attesting Officer

Commissioner of Patents and Trademarks